UNITED STATES PATENT OFFICE.

WILLIAM J. MENZIES, OF SAINT HELEN'S, COUNTY OF LANCASTER, ENGLAND.

NEUTRAL POTASH SOAP.

SPECIFICATION forming part of Letters Patent No. 254,832, dated March 14, 1882.

Application filed February 8, 1882. (No specimens.)

*To all whom it may concern:*

Be it known that I, WILLIAM JONES MENZIES, a British subject, residing at Saint Helen's, county of Lancaster, England, have invented a Neutral Potash Soap; and I do hereby declare the following to be a full, clear, and exact description of the invention, such as will enable others skilled in the art to which it appertains to make and use the same.

The potash soap of commerce has hitherto always been strongly alkaline and corrosive, unfitting it for finer purposes, notwithstanding that a neutral potash soap is superior to a neutral soda soap, owing to its greater solubility and superior detergent properties.

The following hitherto has been the process of manufacture: Wood-ashes have been taken (or carbonate of potash, more or less impure, manufactured from mineral potash) and dissolved in water. The lye thus obtained is causticized with lime, but never completely so, as the apparatus used by the soap-maker has been imperfect, and also it is impossible to obtain a causticity of or exceeding ninety per cent., unless the lye is made of a strength much too weak for the subsequent saponification, and then boiled up again, and the remaining carbonate crystallized or salted out, which in practice never has hitherto been done by the soap-maker. The potash lye therefrom used by the soap-maker has actually always contained from ten to twenty per cent. of uncausticized carbonate of potash, besides chlorides, sulphites, and other impurities. The result has been that to effect complete saponification of the tallow or oil by boiling in the usual manner with a lye containing all these impurities an excess of caustic-potash lye has always to be taken, owing to the impurities retarding the action of the caustic-potash lye and preventing the last traces combining with the oil or tallow used. Now, as no salting-out process is possible with a potash-soap, (as in the case of a soda soap,) owing to its extreme solubility, all the excess of caustic potash and uncombined carbonate of potash and the other impurities necessarily remain in the soap, and the result is a soap strongly caustic, and, in addition, containing much uncombined alkali in the form of carbonate of potash, rendering it quite unfit for fine uses, for sutting woolen goods.

Now, I have discovered that it is only necessary to procure a pure caustic potash, or one comparatively free from carbonate and the other impurities before mentioned, to obtain a neutral potash soap, and my invention is based on this discovery. A caustic potash suitable for carrying out my invention is now to be obtained in the market, and may be prepared by processes now known to chemists. The best potash heretofore used by soap-makers is not suitable for the purpose, and even the stick potash sold by the druggists is by no means pure, and contains so much carbonate as to unfit it for my purpose.

My manner of procedure is as follows: I take fifty pounds of the pure eighty-four per cent. caustic potash, now sold as a commercial article, and dissolve it in its own weight of water. I do not confine myself exactly to this quantity of water, though I have found the quantity named to work best in practice. I pour this strong potash-lye, having a specific gravity of about 1.42, and at a temperature of about 90° Fahrenheit, into from two hundred to two hundred and ten pounds of melted tallow, grease, or lard, or cotton-seed, linseed, or any other vegetable or mineral oil, at a temperature of about 120° Fahrenheit, the precise quantity varying slightly with the tallow, grease, or oil employed. After stirring so as to mechanically mix the lye and melted tallow or oil, I cover up the mixture, in order to keep in the heat generated by the slow process of saponification, which is set up and generally completed in about two days. The result is a neutral potash soap highly concentrated. If made with tallow only, it is fairly hard and fit for use. If with oil, it is dull, opaque, and soft. It can, however, be used, as it is, for washing purposes; but I prefer in the case of an oil soap to add about fifty per cent. of water to the concentrated soap after saponification is completed, and slowly melt and combine the two together, the result being a clear transparent soap with greater consistency than before.

A neutral potash soap can be made by boiling with pure caustic-potash lye made from pure caustic potash in a similar manner to the process employed with an impure lye made from wood-ashes or carbonate of potash; but I prefer the above process as being more economical and giving a better result than when boiling is employed.

The advantage of a pure neutral potash soap, which is a new article of commerce, is that it will not injure the fiber of wool or silk or destroy colors; that a neutral potash soap is superior to a neutral soda soap, especially in the case of woolen or silk tissues, rendering these substances softer and with a better handle than when soda soap is employed. Potash also bleaches the fiber of the wool, while soda turns it yellow.

Having thus described my invention, what I claim, and desire to secure by Letters Patent of the United States, is—

1. A neutral potash soap, substantially as herein described.

2. The process herein described for producing potash soaps, consisting in treating saponifiable oils and fats with a caustic potash free from carbonate, substantially as set forth.

3. In the manufacture of potash soap, the treatment of a caustic potash of the purity and strength described with saponifiable oils and fats, in substantially the proportions set forth.

In testimony of which invention I have hereunto set my hand.

WILLIAM J. MENZIES.

Witnesses:
LISLE STOKES,
R. S. CHILD, Jr.